United States Patent
Kato et al.

(10) Patent No.: US 7,855,819 B2
(45) Date of Patent: Dec. 21, 2010

(54) SWING MEMBER DEVICE, AND OPTICAL DEFLECTOR AND IMAGE-FORMING APPARATUS EMPLOYING THE SWING MEMBER DEVICE

(75) Inventors: Takahisa Kato, Tokyo (JP); Takahiro Akiyama, Kawasaki (JP); Kazutoshi Torashima, Palo Alto, CA (US); Suguru Miyagawa, Yokohama (JP); Kazunari Fujii, Kawasaki (JP); Shinichiro Watanabe, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 12/198,848

(22) Filed: Aug. 26, 2008

(65) Prior Publication Data

US 2009/0067019 A1   Mar. 12, 2009

(30) Foreign Application Priority Data

Sep. 12, 2007   (JP) .............................. 2007-236746

(51) Int. Cl.
   *G02B 26/08* (2006.01)
(52) U.S. Cl. ................................. 359/224.1; 359/212.1
(58) Field of Classification Search ............... 359/212.1, 359/212.2, 213.1, 214.1, 223.1, 224.1, 225.1, 359/226.1
   See application file for complete search history.

(56) References Cited

U.S. PATENT DOCUMENTS

| | | | | |
|---|---|---|---|---|
| 6,803,843 | B2 | 10/2004 | Kato et al. | 335/78 |
| 6,924,915 | B2 | 8/2005 | Hirose et al. | 359/224 |
| 7,050,211 | B2 | 5/2006 | Orcutt | 359/224 |
| 7,129,964 | B2 | 10/2006 | Akiyama et al. | 347/235 |
| 7,376,161 | B2 | 5/2008 | Fujii et al. | 372/21 |
| 7,385,746 | B2 | 6/2008 | Ishibe et al. | 359/215 |
| 2006/0164710 | A1* | 7/2006 | Fujii et al. | 359/224 |
| 2007/0052797 | A1 | 3/2007 | Fujii et al. | 348/102 |
| 2007/0115072 | A1 | 5/2007 | Kato et al. | 331/176 |
| 2007/0115526 | A1 | 5/2007 | Kato et al. | 359/198 |

FOREIGN PATENT DOCUMENTS

| | | |
|---|---|---|
| JP | 4-211218 | 8/1992 |
| JP | 2006-162949 | 6/2006 |
| JP | 2007-240880 | 9/2007 |
| WO | 2007/094489 | 8/2007 |

* cited by examiner

*Primary Examiner*—Euncha P Cherry
(74) *Attorney, Agent, or Firm*—Fitzpatrick, Cella, Harper & Scinto

(57) ABSTRACT

A swing member device comprises a swingable part supported by a supporting part to be swingable around a torsional axis on a supporting base in at least one intrinsic oscillation mode: the swing member device having a temperature-raising unit for raising the temperature of ambient atmosphere in the region of swing motion of the swingable part, the temperature-raising unit raising the temperature of the ambient atmosphere to enable decrease of an influence of an unsteady dragging force caused by the ambient atmosphere.

13 Claims, 11 Drawing Sheets

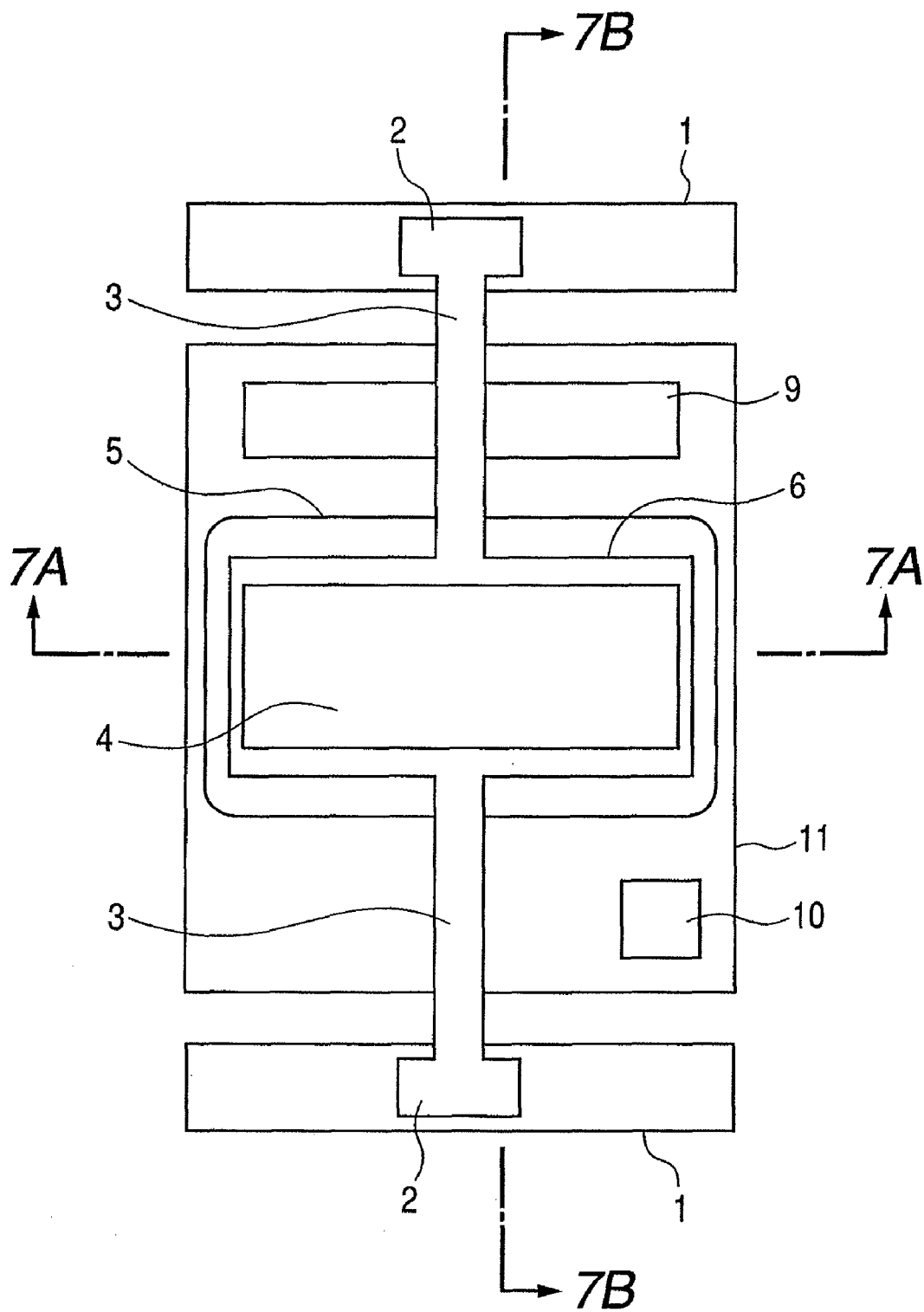

SWING MEMBER DEVICE, AND OPTICAL DEFLECTOR AND IMAGE-FORMING APPARATUS EMPLOYING THE SWING MEMBER DEVICE

BACKGROUND OF THE INVENTION

1. Field of the Invention

The present invention relates to a swing member device, and an optical deflector and image-forming apparatus employing the swing member device. The present invention relates also to a technique for an optical deflector employing a swing member device, which is useful for an image-forming apparatus such as a projection display which projects an image by scanning with a deflected light beam; a laser beam printer utilizing an electrophotography process; and a digital copying machine.

2. Description of the Related Art

A microscopic mechanical member produced from a wafer by a semiconductor process can be worked in a micrometer size. Various functional elements are produced with the microscopic mechanical member. For example, various actuators (swing member device) are disclosed which utilizes a resonance phenomenon of a swingable part (swing member) produced by such a technique and is swung torsionally (see U.S. Pat. No. 7,050,211, etc.).

Such an optical deflector for scanning with a light beam by utilizing the resonance phenomenon of the swingable part (swingable member) having a mirror as the optical deflector on the swingable member is advantageous in comparison with a conventional optical scanning system employing a rotating polygon mirror as described below. That is, the optical deflector can be miniaturized; the optical deflector employing a silicon single crystal produced by a semiconductor process does not cause metal fatigue and has high durability; and the optical deflector consumes less electric power. In particular, the power consumption can be further reduced by driving the swingable member at or near the frequency of the intrinsic oscillation mode of torsional swing of the swingable member.

However, the aforementioned optical deflector employing the swing member device utilizing the resonance phenomenon has a disadvantage of irregular deviation of the swingable member during the swing motion, causing deterioration of image quality with the image formation apparatus. The irregular deviation of the swingable member is caused by an unsteady drag force caused by environment in the driving region of the swingable member driven by a driving unit. That is, the air around the plate of the swingable member is disturbed during swing motion of the swingable member by air resistance and makes the swing motion unstable. To prevent the irregular swing deviation of the swingable member, the swingable member may be sealed in a vacuum or at a low pressure. However, this makes the production process complicated and raises the production cost.

To solve the above problems, the present invention intends to provide a swing member device which has a simple constitution and can be produced at a low cost, and is affected less by unsteady drag force caused by ambient atmosphere in the region of movement of the swingable member. The present invention intends also to provide an optical deflector and an image-forming apparatus employing the above swing member device.

SUMMARY OF THE INVENTION

The present invention is directed to a swing member device comprising a swingable part supported by a supporting part to be swingable around a torsional axis on a supporting base in at least one intrinsic oscillation mode: the swing member device having a temperature-raising unit for raising the temperature of ambient atmosphere in the region of swing motion of the swingable part, the temperature-raising unit raising the temperature of the ambient atmosphere to enable decrease of an influence of an unsteady dragging force caused by the ambient atmosphere.

The device can further comprise a control circuit for controlling the temperature-raising unit, and a scanning-time-detecting means for detecting a time for scanning with the swingable part between a prescribed angle range; and the operation of the temperature-raising unit is controlled to have dispersion of the time for scanning to be within a prescribed range.

The present invention is directed to an image-forming apparatus comprising a light source, a photosensitive member, and the optical deflector employing the swing member device; the light beam from the light source being deflected by the optical deflector to introduce at least a part of the light beam to the photosensitive member to form an image, wherein the image formation can be started after the dispersion of the time detected by the scanning-time-detecting means is less than a prescribed time.

The swing member device can comprise a control circuit for controlling the temperature-raising unit, and a temperature-sensor means for sensing the temperature of the ambient atmosphere; and the control circuit controls the temperature-raising unit to keep the detected temperature to be not lower than a prescribed temperature.

The prescribed temperature can be not lower than 35° C.

The present invention is directed to an image-forming apparatus comprising a light source, a photosensitive member, and the optical deflector employing the swing member device; the light beam from the light source being deflected by the optical deflector to introduce at least a part of the light beam to the photosensitive member to form an image, wherein the image formation can be started after the temperature detected by the temperature-detecting means is not lower than a prescribed temperature.

The temperature-raising unit can be constituted of a heating resistor which generates heat by application of an electric current.

The temperature-raising unit can be constituted of a high heat-conductive material connecting thermally an outside heat source with the ambient atmosphere.

The present invention is directed to an image-forming apparatus comprising a light source, a photosensitive member, and the optical deflector employing the swing member device; the light beam from the light source being deflected by the optical deflector to introduce at least a part of the light beam to the photosensitive member to form an image, wherein a heat generated at an image fixing assembly for fixing the image transferred to the recording medium is utilized as the outside heat source.

The present invention is directed to an optical deflector comprising the swing member device, and an optical deflecting element provided on the swingable part of the swing member device.

The present invention is directed to an image-forming apparatus comprising a light source, a photosensitive member, and the optical deflector; and a light beam from the light source being deflected to introduce at least a part of the light beam to the photosensitive member.

The light beam from the optical deflector can be introduced through a lens to the photosensitive member, and a wall is provided between the optical deflector and the lens to prevent a flow of the ambient atmosphere.

The wall can be constituted of a heat-insulating wall.

Further features of the present invention will become apparent from the following description of exemplary embodiments with reference to the attached drawings.

BRIEF DESCRIPTION OF THE DRAWINGS

FIG. 2A is a top view thereof; and FIG. 2B is a sectional view taken along line 2B-2B in FIG. 2A for describing the swingable part of the swing member device.

FIG. 6 illustrates an optical deflector in Example 1 of the present invention.

FIG. 7A is a sectional view taken along line 7A-7A in FIG. 6, and FIG. 7B is a sectional view taken along line 7B-7B in FIG. 6.

FIG. 10A is a sectional view taken along line 10A-10A in FIG. 9; and FIG. 10B is a sectional view along line 10B-10B for describing the optical deflector and the transparent wall.

FIG. 12A illustrates schematically the image-forming apparatus; and FIG. 12B is a top view for describing the oscillating portion of the optical deflector.

DESCRIPTION OF THE EMBODIMENTS

Embodiments of the present invention are described with reference to drawings.

Embodiment 1

A constitution of an optical deflector employing a swing member device of the present invention is described below.

Figure 1:
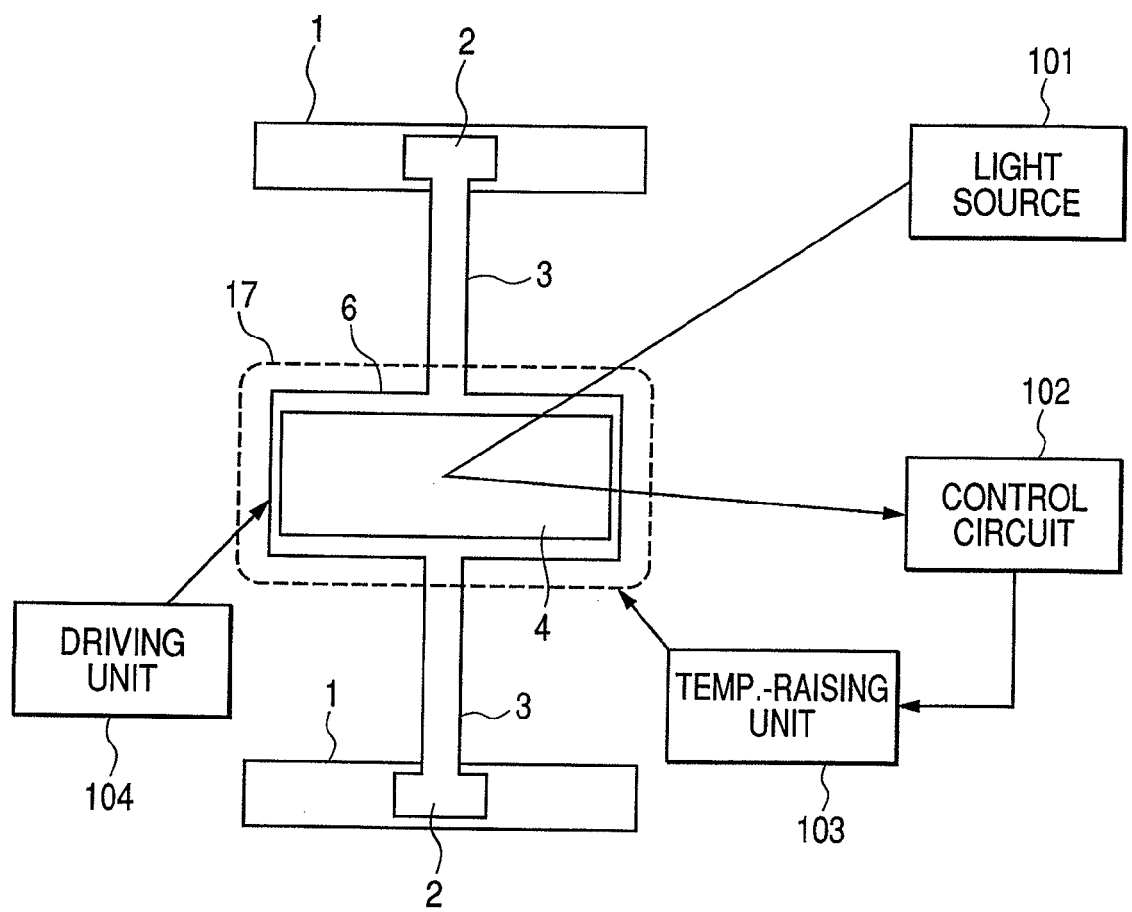
FIG. 1 illustrates a constitution of the optical deflector in Embodiment 1 of the present invention.
Figure 2A:
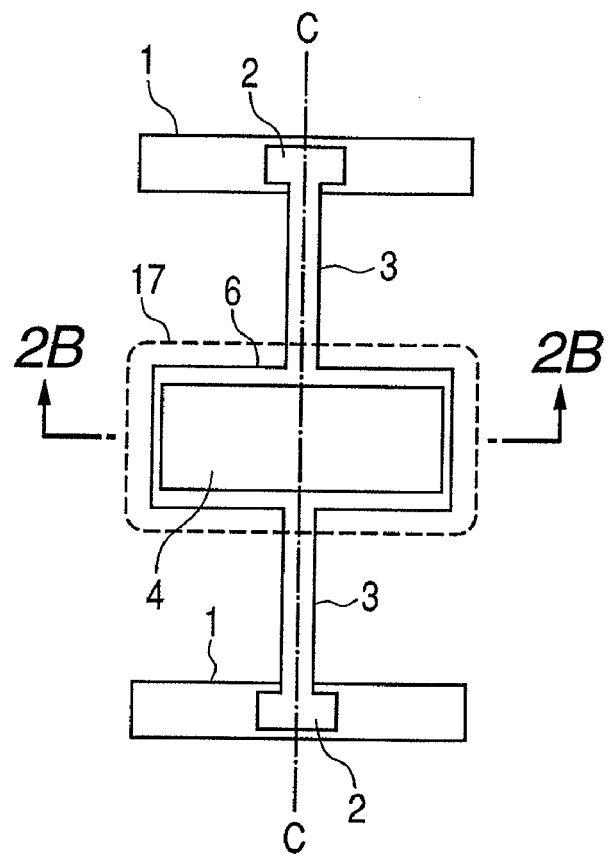
FIGS. 2A and 2B illustrate a constitution of the swing member device in Embodiment 1 of the present invention.
Figure 2B:
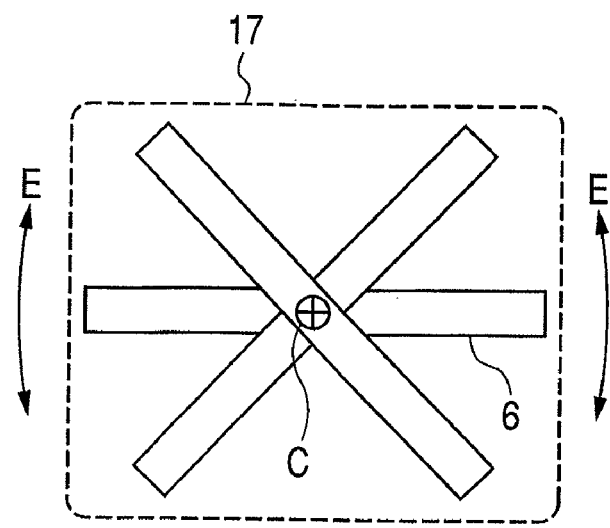

FIG. 1 illustrates a constitution of an optical deflector in this Embodiment of the present invention. FIGS. 2A and 2B illustrate a constitution of a swing member device of this Embodiment. FIG. 2A is a top view of the swing member device, and FIG. 2B is a sectional view of the device taken along line 2B-2B in FIG. 2A for describing the swingable part of the swing member device.

In this Embodiment, a swing member device is constituted of fixing parts 1, supporting bases 2 fixed to the fixing parts, and swingable part 6 which is swingable in at least one intrinsic oscillation mode and supported to be torsionally oscillated (to be swingable) around a torsional swing axis with the aid of supporting parts 3 comprised of torsional springs. This swingable part 6 can be driven in the intrinsic oscillation mode by driving unit 104. Further, in this Embodiment, reflection surface 4 is provided as an optical deflecting element on swingable part 6 to constitute the optical deflector. The numeral 103 denotes a temperature-raising unit.

An image-forming apparatus can be constituted from the above optical deflector, light source 101, and a photosensitive member, so that the light beam from light source 101 is deflected toward the photosensitive member.

The swing member device of this Embodiment is described more specifically below. As shown in FIG. 2A, this swing member device has swingable part 6 supported through a pair of supporting parts 3 and fixed to supporting bases 2. The supporting bases 2 at the both ends are fixed respectively to fixing parts 1. Thus, swingable part 6 is supported elastically by a pair of supporting parts 3 for elastic oscillation around the torsional axis (C axis) as the center in the intrinsic oscillation mode for torsional swing around the torsional C-axis.

The frequency "f" of the intrinsic oscillation mode is represented by Equation 1, as well known:

$$2 \cdot \pi \cdot f = \sqrt{(2 \cdot K/I)}$$ (Equation 1)

where K denotes a torsional spring constant of one supporting part 3 around the torsional axis C, and I denotes the moment of inertia of swingable part 6 around the torsional axis C.

As illustrated in FIG. 1, driving unit 104 drives swingable part 6 at a frequency nearly equal to the intrinsic oscillation mode frequency by power-saving drive.

Next, the air resistance is described which is caused by the air around the moving plate (swingable part), namely a dragging force caused by the ambient air.

FIG. 2B, a sectional view taken along line 2B-2B in FIG. 2A, illustrates swingable part 6 at the stand-by position and at the maximum deflection angles in the swing movement region. Swingable part 6 disturbs ambient atmosphere 17 in the broken-line-surrounded region in FIG. 2B during the swinging movement. Thereby ambient atmosphere 17 exerts a dragging force to swingable part 6 to retard the swing motion. When the light deflecting device is constituted to have a smaller "I" in Equation 1, the dragging force caused by the ambient air pushed away by swing of swingable part 6 becomes larger relatively. The dragging force of the ambient atmosphere includes an average steady force component and a nonsteady force component. The nonsteady component varies depending on the driving position and driving velocity, causing irregular deviation of swingable part 6 driven at or near the intrinsic oscillation mode to lower the scanning stability of the light deflection device employing such a swing member device.

In this Embodiment, the portion of swingable part 6 of the swing member device is constituted to be capable of heating ambient atmosphere 17 by a temperature-raising unit 103 as illustrated in FIG. 1. By heating the ambient atmosphere in the driving region of the swingable part, the swingable part 6 can be driven with a less influence of the nonsteady dragging force component of the ambient air. Thereby the stability of scanning with the optical deflector employing the swing member device can be improved.

With the above constitution of this Embodiment, the stability of scanning is improved by driving the swingable part in a heated ambient atmosphere 17 regardless of the shape of swingable part 6. In particular, the stability of scanning can be obtained even when the reflection surface of the swingable part 6 has a large area. With such an optical deflector, the image-forming apparatus is capable of forming an image stably with high resolution. Furthermore, even with a smaller value of "I" (moment of inertia) in Equation 1, the scanning stability can be increased. Thereby, the rigidity of the torsion spring can be lowered, and the spring can be made smaller to be less liable to be broken.

Figure 11:
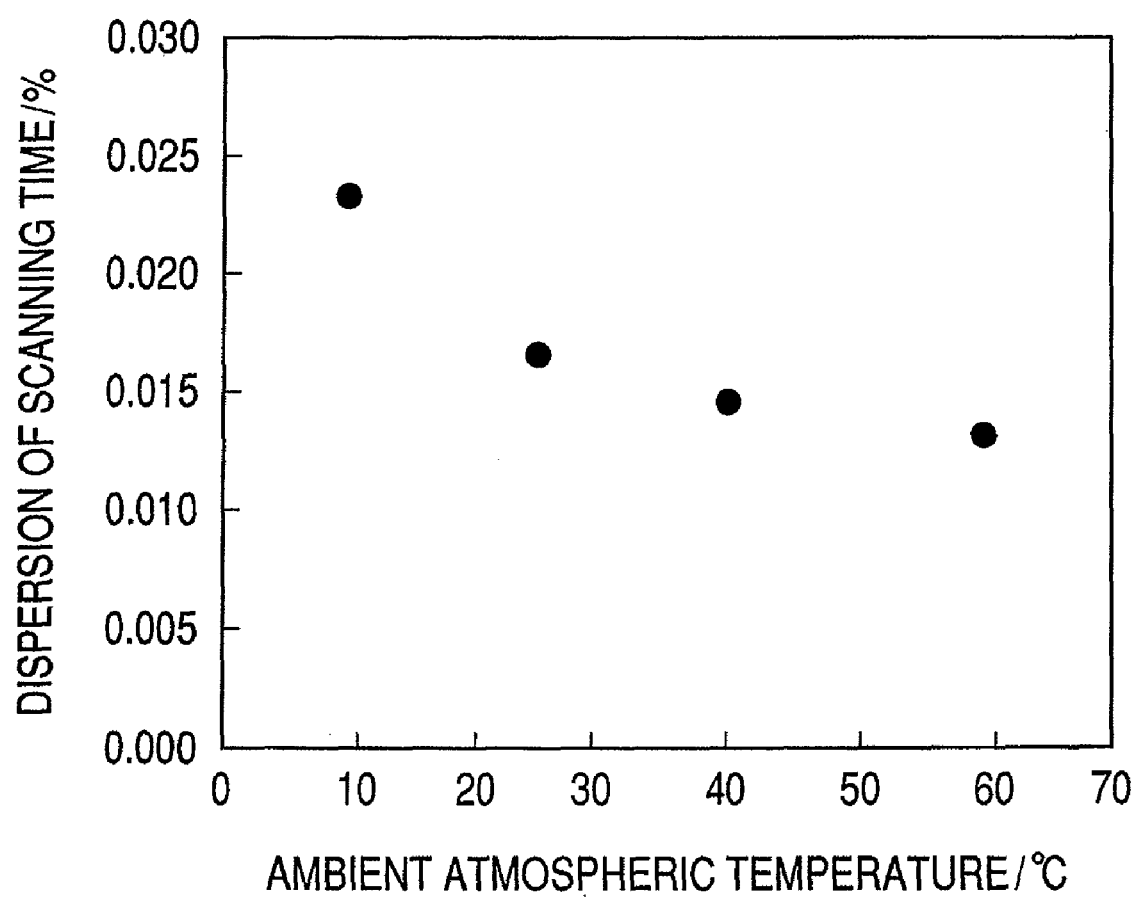
FIG. 11 is a graph showing dependence of dispersion of the scanning time on the ambient temperature around the optical deflector.

Next, the scanning stability of an image-forming apparatus is described which employs the light-deflector of this Embodiment. FIG. 11 is a graph showing dependence of dispersion of the scanning time (i.e., scanning stability) on the temperature of the ambient atmosphere.

The scanning stability, which will affect greatly the quality of the image formed by an image-forming apparatus can be improved by decreasing the dispersion of the scanning time as described below. In FIG. 1, the light beam projected from light source 101 is introduced to reflection surface 4, and is allowed to scan at a prescribed frequency and a prescribed amplitude. During the scanning, the scanning time for every scanning can be measured by a scanning-time-detecting means. The scanning time can be detected, for example, with light-sensitive element placed at the both ends of the scanning region by detecting the timing of crossing of the scanning light beam over the respective light-sensitive elements. The dispersion of the scanning time is narrower at a higher temperature of the ambient atmosphere as shown in FIG. 11, and the scanning is stabilized. In particular, scanning can be stabilized at the temperature of 35° C. or higher, whereas at the temperature of 60° C. or higher, the precision of positional registration of optical parts of the optical deflector is adversely affected. Therefore, the temperature is not higher than 60° C. Otherwise the temperature-raising unit may be constituted of a heating resistor which generates heat by application of an electric current, or may be constituted of a heat conductor connecting thermally the ambient atmosphere to an outside heat source.

Control circuit 102 in FIG. 1 serves to control the function of temperature-raising unit 103. In this Embodiment, a scanning-time-detecting means is provided for detecting the time of scanning by swingable part 6 in the prescribed scanning angle range. Control circuit 102 controls temperature-raising unit 103 to heat ambient atmosphere 17 in order to decrease the dispersion of the scanning time measured by the scanning-time-detecting means to the intended smaller dispersion. Such control of temperature-raising unit 103 by control circuit 102 enables decrease of dispersion of the scanning time regardless of the change in the ambient temperature. Thus, by bringing the dispersion of the scanning time within the intended range, the temperature-raising unit can be controlled without temperature measurement. Ambient atmosphere 17 herein signifies the region of driving of swingable part 6 as indicated by a broken line in FIG. 2B. Therefore, the effect of the temperature rise can be instantaneously detected without installation of a temperature measurement element for measuring the ambient temperature in the fine region.

As described above, with a simple and low-cost constitution, the stability of scanning can be improved by controlling the temperature-raising unit to decrease the influence of the unsteady dragging force coming from the ambient atmosphere in the driving region of the swingable part and to decrease irregular deviation of the swingable part.

Embodiment 2

Another constitution of the optical deflector is described which is different from that of Embodiment 1.

Figure 3:
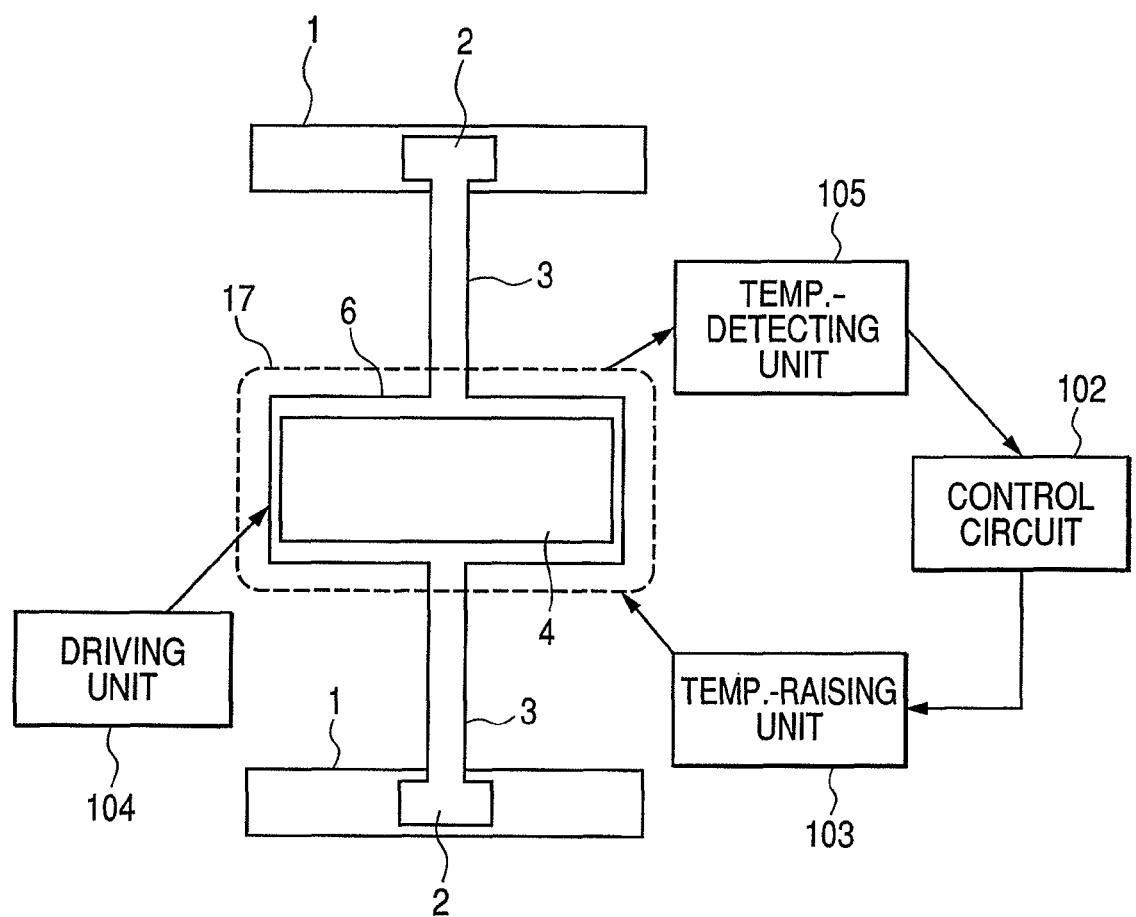
FIG. 3 illustrates a constitution of the optical deflector in Embodiment 2 of the present invention.

FIG. 3 illustrates a constitution of the optical deflector of this Embodiment of the present invention. In FIG. 3, the same symbols are used for denoting the same members as in Embodiment 1 without definition.

As illustrated in FIG. 3, this Embodiment employs a temperature-detecting unit 105 for detecting the temperature of ambient atmosphere 17, being different from Embodiment 1. Control circuit 102 controls the operation of temperature-raising unit 103 to keep the temperature to be at the prescribed temperature, or higher. Thereby the stability of scanning can be improved regardless of variation of the environmental temperature.

This Embodiment employs temperature-detecting unit 105 enables direct measurement of the temperature of ambient atmosphere 17 to adjust precisely the temperature. The scanning stability is improved at a higher temperature. This Embodiment is effective, in particular, in the case where an the optical part peripheral to the optical deflector is affected greatly by a high temperature of the environment.

Embodiment 3

Figure 4:
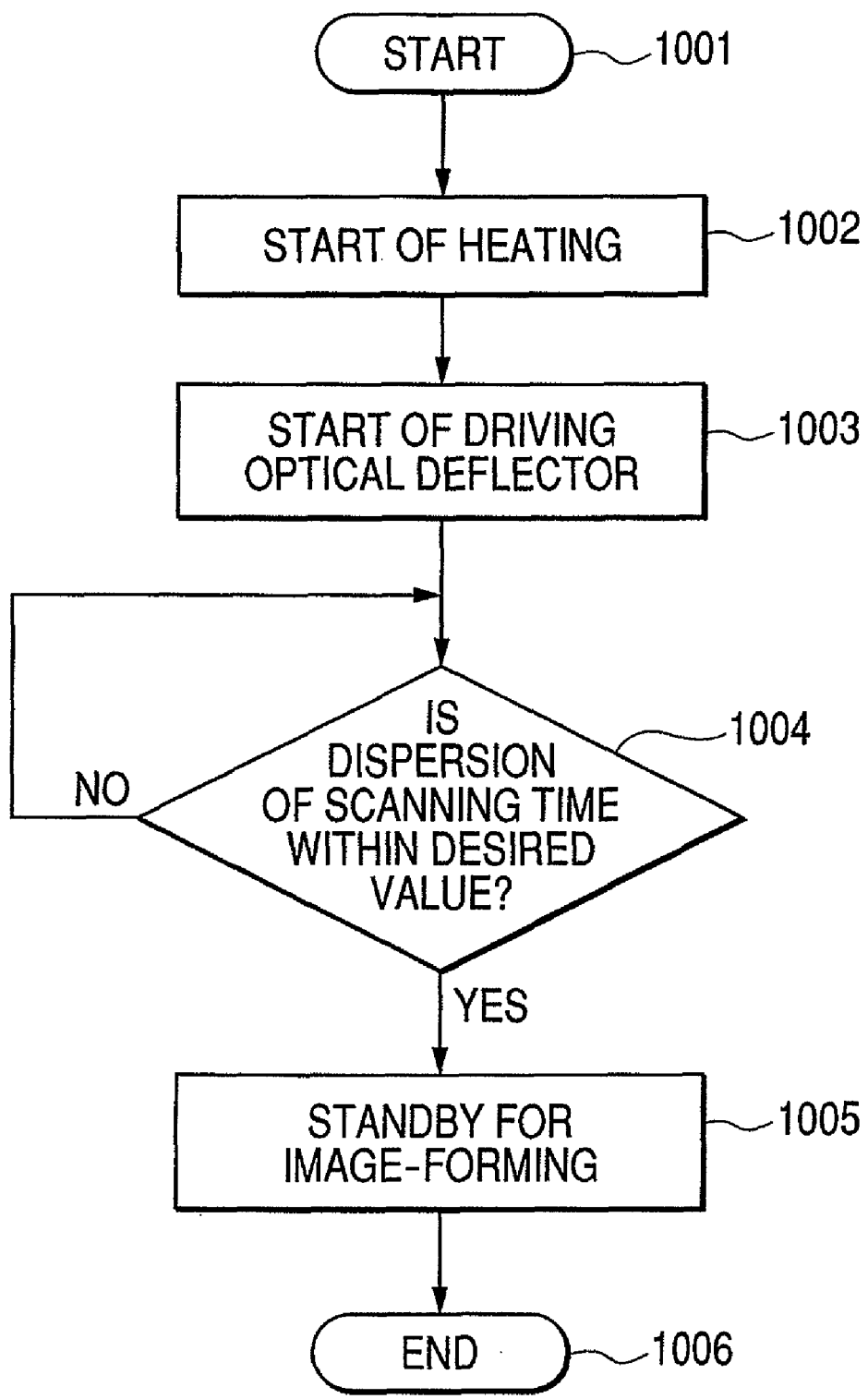
FIG. 4 is a flow chart of the process of image formation with an image-forming apparatus in Embodiment 3 of the present invention.
Figure 5:
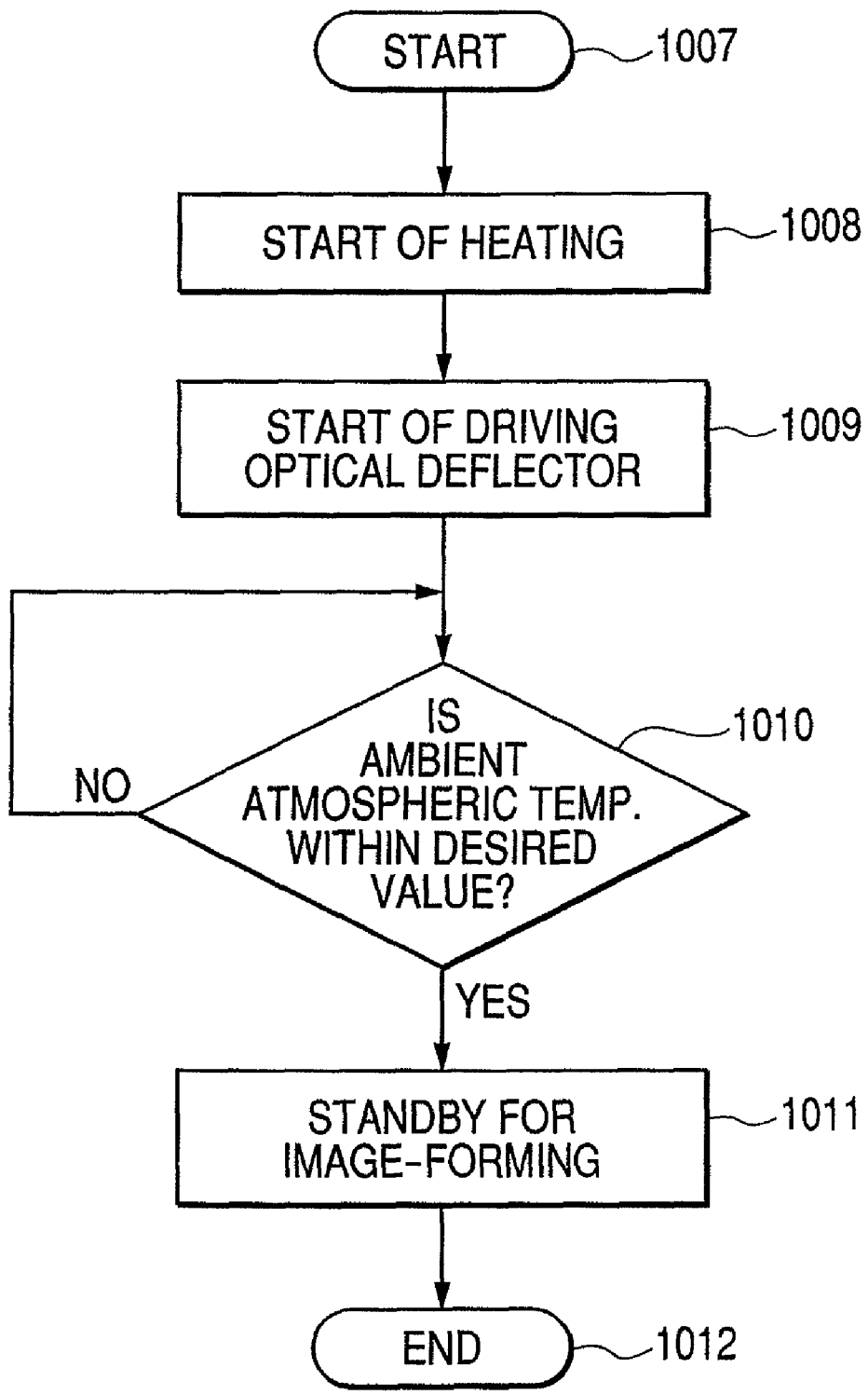
FIG. 5 is a flow chart of the process of image formation with another image-forming apparatus in Embodiment 3 of the present invention.

A constitution of an image-forming apparatus is described which employs an optical deflector containing the swing member device of the present invention. FIG. 4 is a flow chart of image formation by an image forming apparatus employing an optical deflector of the above Embodiment 1. FIG. 5 is a flow chart of image formation by another image forming apparatus employing an optical deflector of the above Embodiment 2.

Firstly the Embodiment illustrated in FIG. 4 is described. In Step 1002, control circuit 102 shown in FIG. 1 actuates temperature-raising unit 103 to start heating of ambient atmosphere 17. Then in Step 1003, driving unit 104 drives swingable part 6 to start the scanning with a light beam. In Step 1004, a scanning-time-detecting unit measures the dispersion of the scanning time. In this step, control circuit 102 determines whether or not the scanning time dispersion is within a prescribed acceptable dispersion range. If the dispersion is wider than the prescribed range, the heating is continued by temperature-raising unit 103, whereas if the dispersion is in the prescribed range, the preliminary operation of the image formation is completed and the image formation is started. As described above, with the image-forming apparatus described by FIG. 4, the image formation can be started when the dispersion of the scanning time measured by the scanning-time-detecting unit is within a prescribed range.

Next, the Embodiment illustrated in FIG. 5 is described. This embodiment includes Step 1010, being different from that shown in FIG. 4. In the embodiment shown in FIG. 5, temperature-sensing unit 105 senses the temperature of ambient atmosphere 17 in Step 1010. If the temperature is lower than the prescribed temperature, control circuit 102 allows temperature-raising unit 103 to continue the heating. When the temperature has reached the prescribed temperature, the apparatus is ready for image formation. Then the image formation is started. As described above, with the image-forming apparatus described by FIG. 5, the image formation can be started when the temperature detected by the temperature-detecting unit comes to be at the prescribed temperature or higher.

The image-forming apparatus of this Embodiment as described with reference to FIGS. 4 and 5, is capable of forming stably an image of a high quality regardless of a change of the ambient temperature.

EXAMPLES

Example 1

Figure 7A:
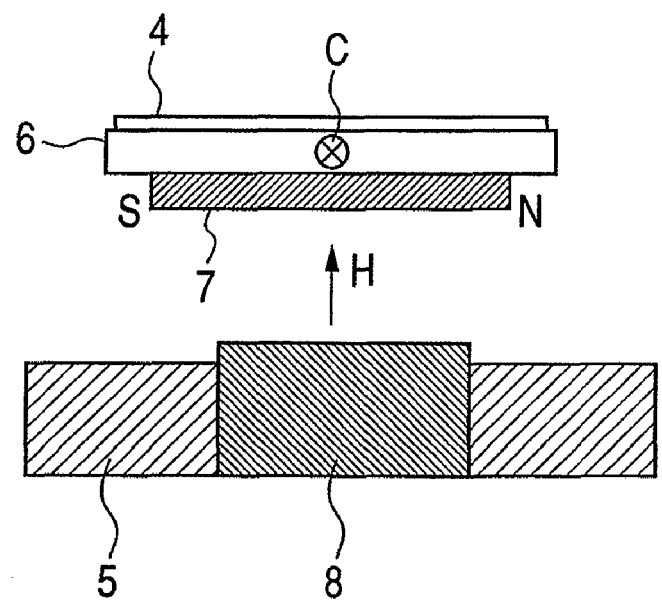
FIGS. 7A and 7B are sectional views for describing the driving unit for driving the optical deflector of Example 1.
Figure 7B:
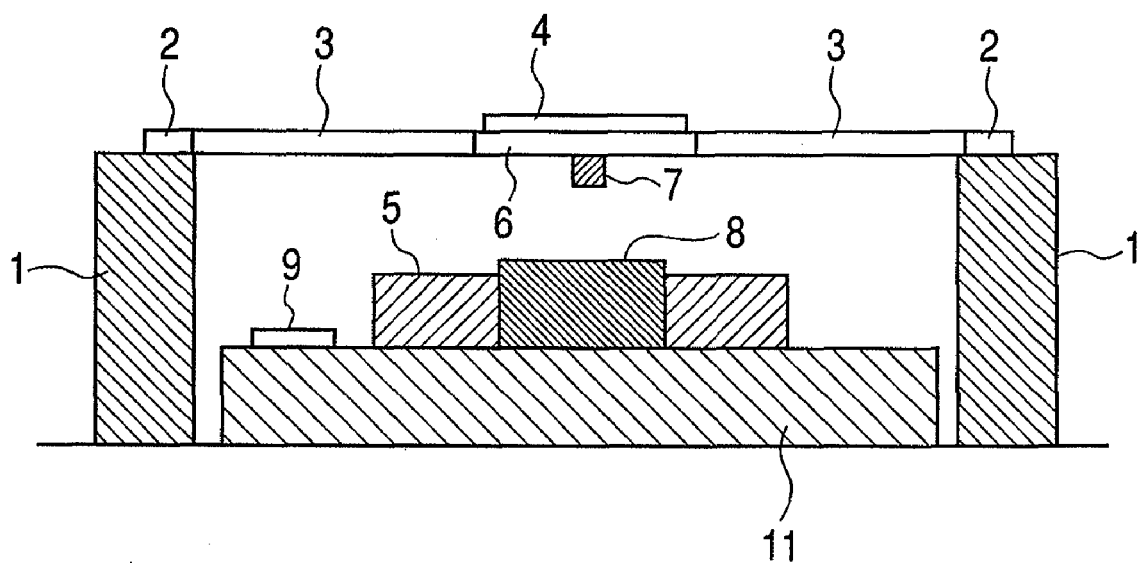

This Example 1 describes the optical deflector employing the constitution of Embodiment 2. FIG. 6 illustrates an optical deflector employed in this Example. FIG. 6 illustrates an optical deflector in this Example. FIGS. 7A and 7B are sectional views for describing the driving unit for driving the optical deflector of Example 1: FIG. 7A is a sectional view taken along line 7A-7A in FIG. 6, and FIG. 7B is a sectional view taken along line 7B-7B in FIG. 6. In FIG. 6 and FIGS. 7A and 7B, the same symbols are used as in Embodiment 2 illustrated in FIG. 3 to denote the members for the same functions. Therefore the corresponding symbols are used without explanation.

The optical deflector of this Example has swingable part 6 of 3 mm in width (length direction) and 1 mm in length having reflection surface 4 of vapor-deposited aluminum. Supporting base 2, supporting part 3, and swingable part 6 are formed in nearly a uniform thickness of 300 μm, as illustrated in FIG. 7B, in integration by dry etching of a silicon wafer. The optical deflector is designed to allow swingable part 6 to swing in an intrinsic oscillation mode at a frequency of 2.4 kHz in torsion direction of supporting parts 3.

The optical deflector of this Example, has coil 5 and core 8 as a driving unit as illustrated in FIG. 7A. Swingable part 6 has permanent magnet 7 on the side reverse to reflection surface 4. Permanent magnet 7 is magnetized to have magnetic poles in the direction as shown in FIG. 7A. AC application to coil 5 generates AC magnetic field in the H direction in FIG. 7A and the reverse direction. By adjusting the frequency of the AC magnetic field nearly to the intrinsic oscillation mode, the torque produced in permanent magnet 7 drives swingable part 6.

On the other hand, coil 5 and core 8 are placed on base 11. Base 11 is not in direct contact with fixing part 1. Base 11 is formed from aluminum of high thermal conductivity. Heating resistor 9 as the heating means and thermistor 10 as the temperature detecting means are placed on base 11. A current flow through heating resistor 9 raises the temperature of the entire of base 11, and the entire base 11 causes temperature rise in the ambient atmosphere around swingable part 6 placed just above. The temperature of the base 11 is measured by thermistor 10. Base 11, which is placed close to swingable part 6, is at a temperature nearly equal to or relative to the ambient atmosphere. Thus, the temperature of the ambient atmosphere can be detected therefrom.

As described above, according to this Example, the scanning stability can be improved by raising the temperature of the ambient atmosphere around swingable part 6. The use of a heating resistor as the temperature-raising means enables temperature rise with a small constitution. In particular, the heating resistor placed near the swingable part 6 enables effective heating only of the region necessary for scanning stability improvement with energy saving and high-speed heating.

Example 2

Figure 8:
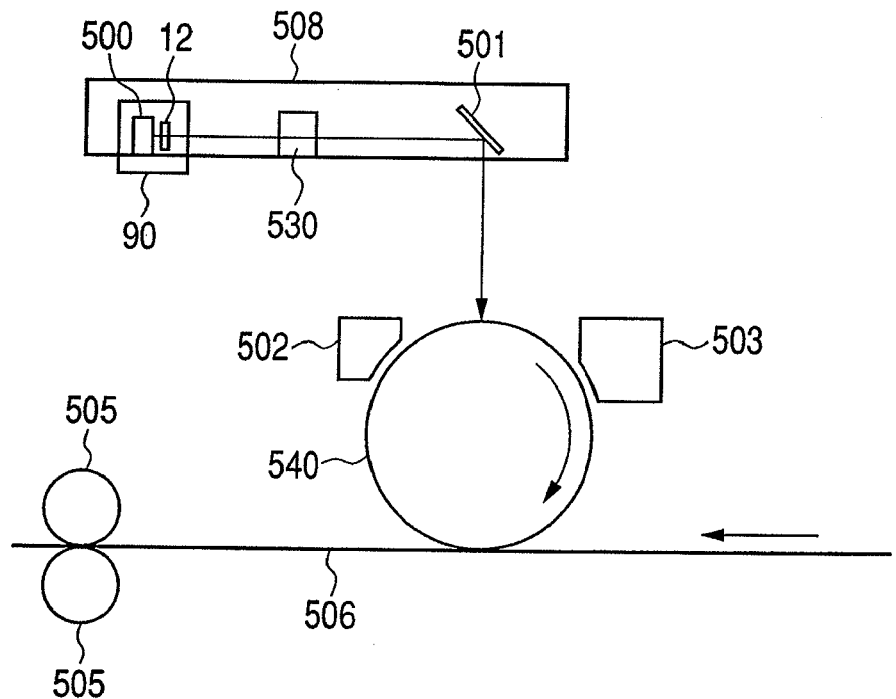
FIG. 8 illustrates schematically an image-forming apparatus in Example 2 of the present invention.
Figure 9:
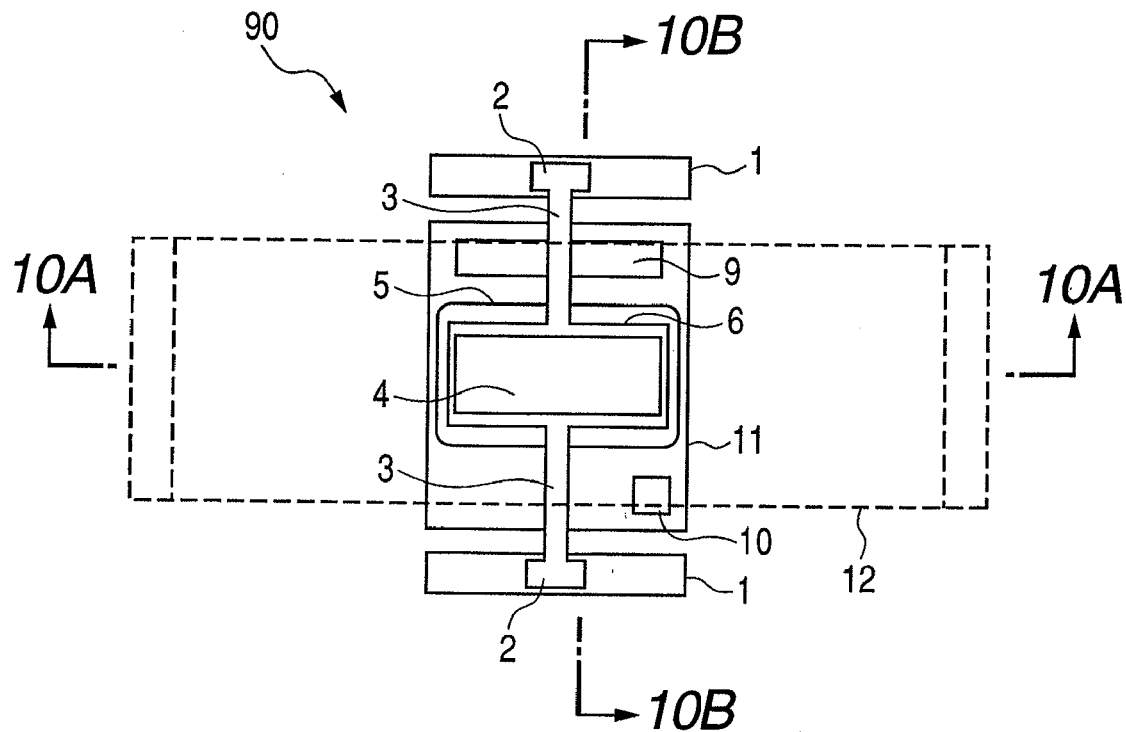
FIG. 9 is a top view for describing detailedly the portion enclosed by broken line 90 in FIG. 8.
Figure 10A:
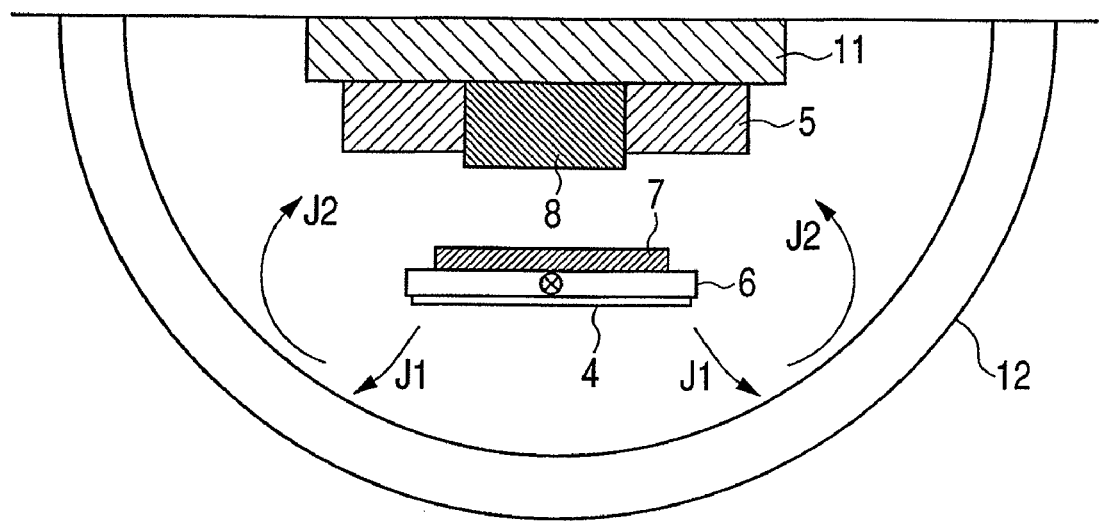
FIGS. 10A and 10B are sectional views for describing the portion enclosed by a broken line in FIG. 8.
Figure 10B:
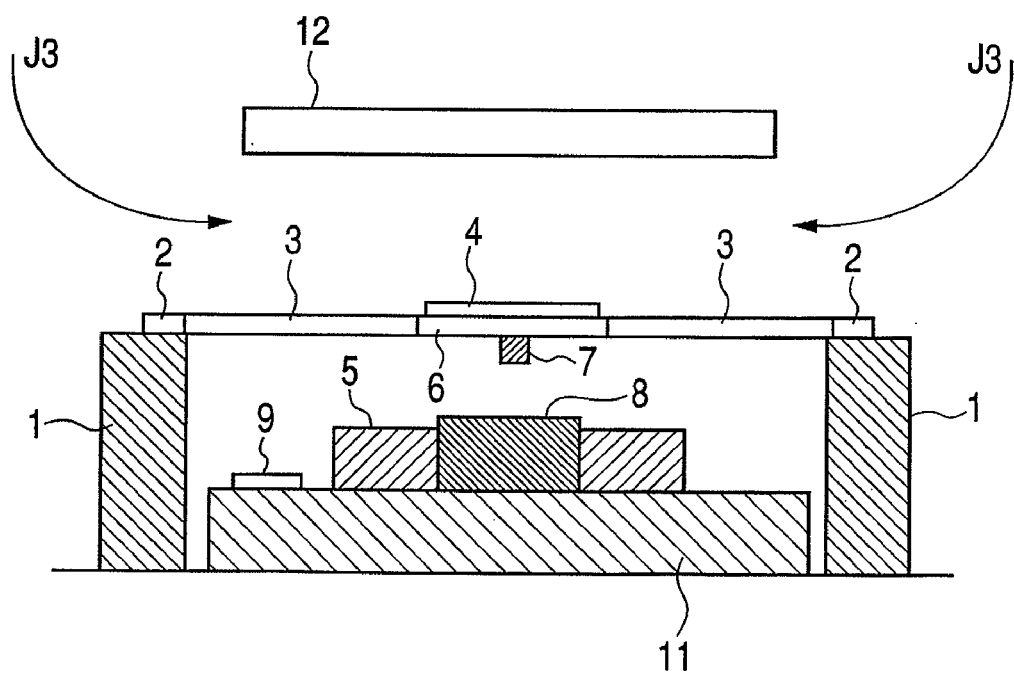

This Example describes an image-forming apparatus which employs the optical deflector of the above Embodiment 1. FIG. 8 is a drawing for describing the image-forming apparatus of this Example. FIG. 9 is a top view for describing detailedly the portion enclosed by broken line 90 in FIG. 8. FIGS. 10A and 10B are sectional views. In these drawings, the same symbols are used as in FIG. 1 to denote the members for the same functions without definition.

In this Example, optical deflector 500 has the same constitution as in Embodiment 1. The light beam introduced from a light source not shown in the drawing is deflected by the optical deflector 500 for scanning. The light beam from the optical deflector is introduced through lens 530 and reflecting mirror 501 to photosensitive member 540 of an image-forming apparatus. The image forming apparatus has photosensitive member 540, charger 502, and developing assembly 503, and forms an electrostatic latent image and transfers a toner image formed by developing assembly 503 to recording medium 506. Then the transferred image is fixed by fixing assembly 505 on recording medium 506. As illustrated in FIG. 8, optical box 508 contains optical deflector 500, lens 530, and reflecting mirror 501 placed respectively at predetermined positions. Between the optical deflector and the lens, transparent wall 12 is provided to prevent the flow of the ambient atmosphere.

Transparent wall 12 is formed from a transparent resin in a shape of a cylinder covering the light deflecting device of Example 1 as illustrated in FIG. 9 and FIGS. 10A and 10B. In particular, as illustrated in FIG. 10A, the transparent wall is formed to cover the optical deflector in the sectional direction 10A-10A in FIG. 9, and covers, as illustrated in FIG. 10B, the optical deflector partly in the sectional direction of 10B-10B in FIG. 9.

In FIGS. 10A and 10B, arrow marks J1, J2, and J3 indicate flows of the ambient atmosphere caused by the swing motion of swingable part 6. The swing motion of swingable part 6 produces air flows J1 and J2 in the direction of the light deflection caused by the optical deflector. Transparent wall 12 prevents the air flow toward lens 530. On the other hand, an air flow is introduced with the swing motion of swingable part 6 as indicated by arrow mark J3 in FIG. 10B. Transparent wall 12 is constituted not to prevent this air inflow.

According to this Example, the transparent wall prevents the flow of the ambient air heated by heating resistor 9 toward lens 530 not to cause temperature rise of lens 530. For this purpose, the transparent wall is preferably formed from a heat-insulating material. By the prevention of the temperature rise, variation of the optical properties and positional deviation can be decreased. Further, transparent wall 12 allows the ambient atmosphere around swingable part 6 to stay longer in the periphery of the temperature-raising unit. Therefore, the atmosphere around swingable part 6 can be heated with a reduced power, and the scanning stability can effectively be improved. Further, since only the peripheral atmosphere is heated, the entire atmosphere in optical box 508 is not heated, preventing positional deviation or variation of optical properties of other optical parts in optical box 508 can be prevented.

Example 3

Figure 12A:
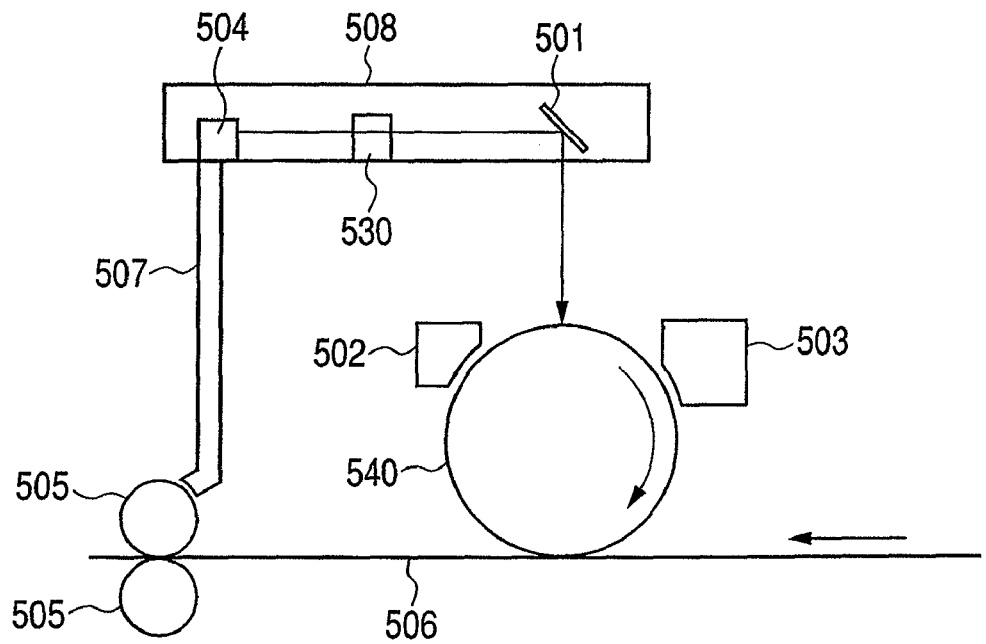
FIGS. 12A and 12B illustrate schematically the image-forming apparatus in Example 3 of the present invention.
Figure 12B:
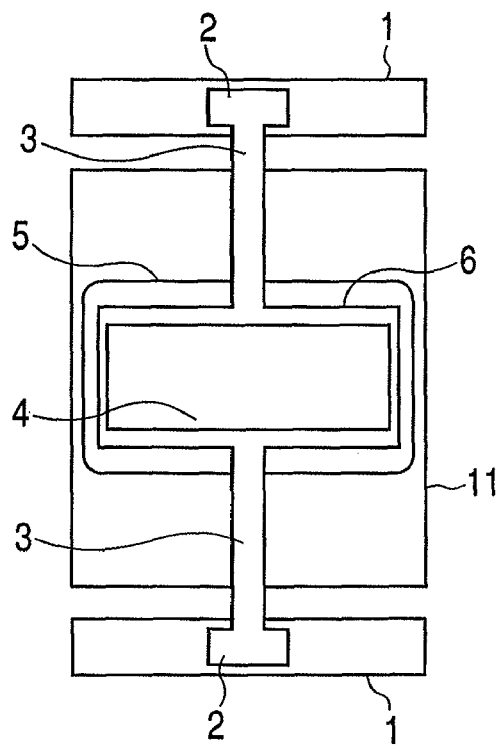

An image-forming apparatus is described which is different in type from the one described in Example 2. FIGS. 12A and 12B illustrate schematically the image-forming apparatus of this Example. FIG. 12A illustrates constitution of the image-forming apparatus of this Example. In FIG. 12A of this Example, the same symbols are used as in FIG. 8 in Example 2 to denote corresponding members without definition.

In this Example, optical deflector 504 in FIG. 12A has the same constitution as the one in Embodiment 1 illustrated in FIG. 1. With the optical deflector, for controlling the dispersion of the scanning time to be within a prescribed region by control circuit 102, light-sensitive elements of the scanning-time-detecting unit are placed at the both ends of the scanning region. The light-sensitive elements (not shown in the drawing) are placed at the ends outside the image-formation region of photosensitive member 540. An image is formed with reference to the timing of the scanning light beam crossing the one light-sensitive elements. From the that timing, the time for reach of the scanning light beam to the other light-sensitive element is measured to estimate the dispersion of the scanning time. FIG. 12A is a top view of the swing part of optical deflector 504 of FIG. 12A.

In this Example, base 11 illustrated in FIG. 1B is connected thermally by high heat-conductive member 507 to fixing assembly 505 illustrated in FIG. 12B. Therefore, the heat generated in image-fixing assembly 505 raises the temperature of base 11, and raises in turn the temperature of the ambient atmosphere around swingable part 6. The heat conductive member 507 may be made of a material containing a high thermal conductivity such as aluminum, copper, and graphite, or a heat pipe. Like this, the thermal connection of the base with an outside heat source in the image-forming apparatus enables rise of the temperature of the ambient atmosphere without special heating means and enables improvement of the scanning stability. The image-forming apparatus for high image quality can be manufactured at a lower cost. The outside heat source is not limited to the above constitution using the heat produced in the image-fixing assembly for fixing an image transferred to a recording medium, but may be constituted of another element in the image-forming apparatus. For example, a means for heating a photosensitive member may be employed as the outside heat source in an image forming apparatus which controls the temperature of the photosensitive member by heating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-236746, filed Sep. 12, 2007 which is hereby incorporated by reference herein in its entirety.

What is claimed is:

1. A swing member device comprising a swingable part supported by a supporting part to be swingable around a torsional axis on a supporting base in at least one intrinsic oscillation mode:
   the swing member device having a temperature-raising unit for raising the temperature of ambient atmosphere in the region of swing motion of the swingable part, the temperature-raising unit raising the temperature of the ambient atmosphere to enable decrease of an influence of an unsteady dragging force caused by the ambient atmosphere.

2. The swing member device according to claim 1, wherein the device further comprises a control circuit for controlling the temperature-raising unit, and a scanning-time-detecting means for detecting a time for scanning with the swingable part between a prescribed angle range; and the operation of the temperature-raising unit is controlled to have dispersion of the time for scanning to be within a prescribed range.

3. An image-forming apparatus comprising a light source, a photosensitive member, and an optical deflector employing the swing member device set forth in claim 2; the light beam from the light source being deflected by the optical deflector to introduce at least a part of the light beam to the photosensitive member to form an image, wherein the image formation can be started after the dispersion of the time detected by the scanning-time-detecting means is less than a prescribed time.

4. The swing member device according to claim 1, wherein the swing member device comprises a control circuit for controlling the temperature-raising unit, and a temperature-sensor means for sensing the temperature of the ambient atmosphere; and the control circuit controls the temperature-raising unit to keep the detected temperature to be not lower than a prescribed temperature.

5. The swing member device according to claim 4, wherein the prescribed temperature is not lower than 35° C.

6. An image-forming apparatus comprising a light source, a photosensitive member, and an optical deflector employing the swing member device set forth in claim 4; the light beam from the light source being deflected by the optical deflector to introduce at least a part of the light beam to the photosensitive member to form an image, wherein the image formation can be started after the temperature detected by the temperature-detecting means is not lower than a prescribed temperature.

7. The swing member device according to claim 1, wherein the temperature-raising unit is constituted of a heating resistor which generates heat by application of an electric current.

8. The swing member device according to claim 1, wherein the temperature-raising unit is constituted of a high heat-conductive material connecting thermally an outside heat source with the ambient atmosphere.

9. An image-forming apparatus comprising a light source, a photosensitive member, and an optical deflector employing the swing member device set forth in claim 8; the light beam from the light source being deflected by the optical deflector to introduce at least a part of the light beam to the photosensitive member to form an image, wherein a heat generated at an image fixing assembly for fixing the image transferred to the recording medium is utilized as the outside heat source.

10. An optical deflector comprising a swing member device set forth in claim 1, and an optical deflecting element provided on the swingable part of the swing member device.

11. An image-forming apparatus comprising a light source, a photosensitive member, and an optical deflector set forth in claim 10; and a light beam from the light source being deflected to introduce at least a part of the light beam to the photosensitive member.

12. The image-forming apparatus according to claim 11, wherein the light beam from the optical deflector is introduced through a lens to the photosensitive member, and a wall is provided between the optical deflector and the lens to prevent a flow of the ambient atmosphere.

13. The image-forming apparatus according to claim 12, wherein the wall is constituted of a heat-insulating wall.

* * * * *